July 27, 1948.  A. C. BLOEMERS  2,445,904
MILKING MACHINE
Filed Feb. 11, 1946
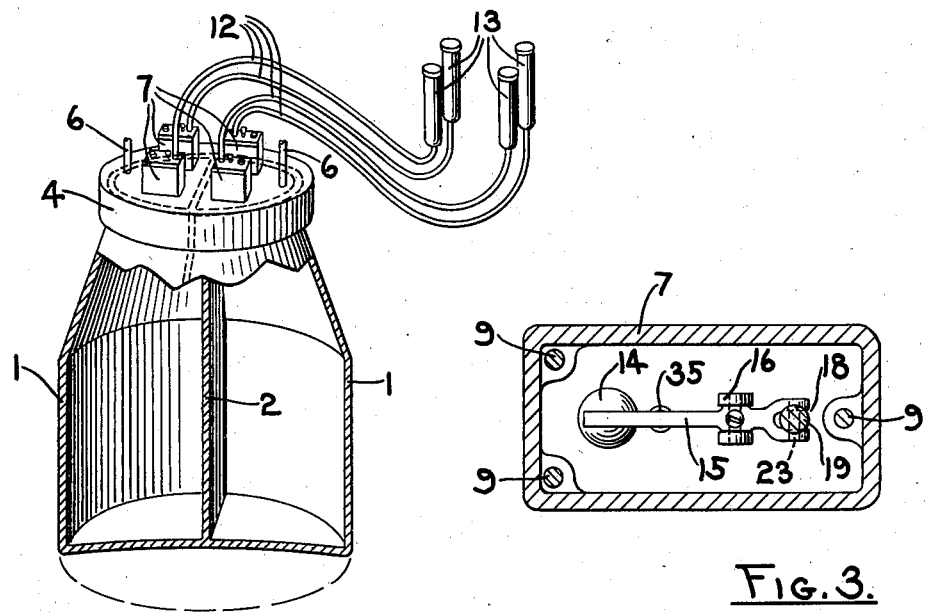
Fig.3.
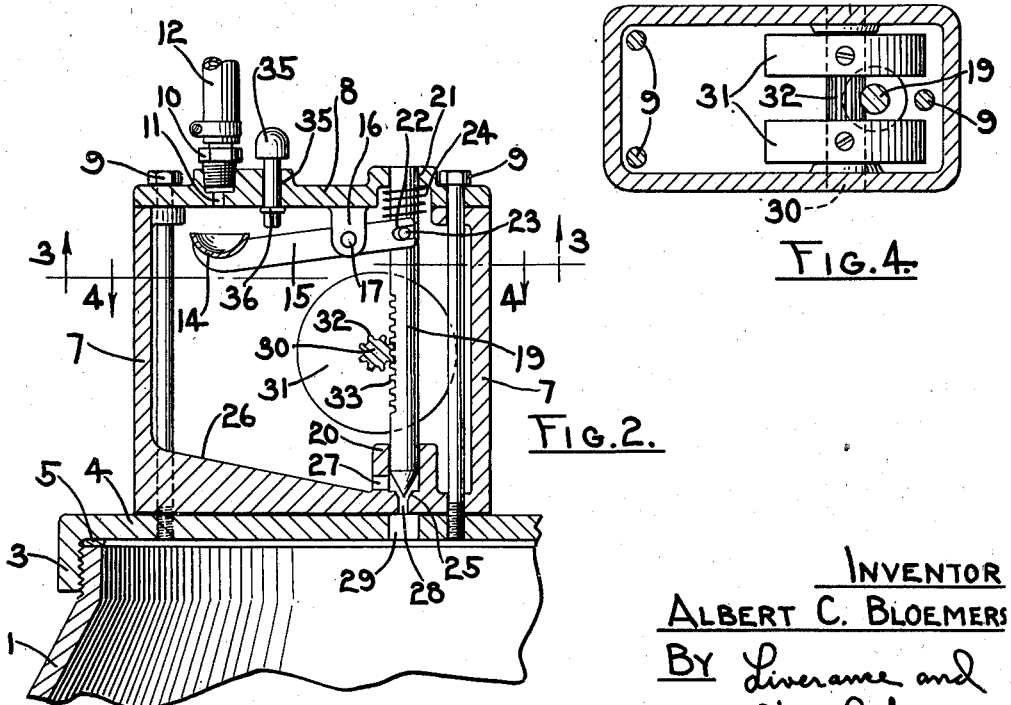
Fig.4.
Fig.1.
Fig.2.
INVENTOR
ALBERT C. BLOEMERS
BY Liverance and
Van Antwerp
ATTORNEYS Patented July 27, 1948

2,445,904

UNITED STATES PATENT OFFICE 2,445,904

MILKING MACHINE

Albert C. Bloemers, Holland, Mich.

Application February 11, 1946, Serial No. 646,866

7 Claims. (Cl. 31—58)

This invention relates to milking machines and more particularly to an automatic shut-off therefor.

An important object of the invention is to provide a milking machine with individual shut-off means for each of the separate hose connections leading to each of the udder suction cups for shutting off the suction thereto as the milk ceases to flow therefrom.

Another object of the invention is to provide means in a shut off valve for preventing the valve from closing when the flow of milk thereto is intermittent or ceases only momentarily.

Another object of the invention is to provide manual means for individually starting suction to each udder to begin the flow of milk therefrom.

A still further object is to provide a shut off valve which is easily and conveniently disassembled into only a few separate pieces for easy cleaning and sterilizing.

Other objects and advantages of the invention will become apparent from a study of the following description taken in connection with the accompanying drawings, in which, Fig. 1 is a sectional perspective view of a milking machine constructed in accordance with my invention.

Fig. 2 is a vertical longitudinal sectional view of the valve construction attached to the top of the milk container.

Fig. 3 is a horizontal sectional view through the valve housing taken along line 3—3 in Fig. 2 looking in the direction of the arrows, and Fig. 4 is a horizontal sectional view through the valve housing taken along line 4—4 in Fig. 2 looking in the direction of the arrows.

Referring to the details of the drawing in which like reference numerals refer to like parts in the several figures of the drawings, the milking machine is provided with a container 1 of the usual shape having in addition an integral partition 2 dividing the container into equal compartments. The container is also provided with a neck portion 3 which screw threadedly receives a cover 4 with gasket 5 therebetween whereby the container and the individual compartments are pneumatically sealed. Suction tubes 6 are connected to the cover 4 in communication with each compartment and at their other ends are connected to conventional intermittent air vacuating means, not shown, whereby the air may be vacuated intermittently from the compartments.

Mounted on the cover are a plurality of valve housings 7, each housing provided with a cover plate 8 with bolts 9 passing downwardly through the cover plate, housing 7 and screw threadedly received into the container cover 4 whereby the top side of the valve housing is closed by the cover plate and the cover and housing assembly attached to the container cover 4.

A hose connection 10 is screwed into the cover plate 8 in communication with the interior of the housing 7 through passage 11 in the cover plate. Attached to the hose connection 10 is a hose 12 provided at its outer end with a suction cup 13. Each of the suction cups 13 communicates with one of the valves and each is adapted to be positioned onto a cow's udder.

Located adjacent the passage 11 in the cover plate 8 is the impact cup 14 in proper position that the milk flowing from passage 11 impinges thereagainst. This cup 14 is of semi-spherical section and is attached to lever 15 pivotally mounted on the bifurcated ear 16 formed integrally with the cover plate, by means of pin 17 extending through the lever 15 and ear 16. The shorter end of the lever 15 is bifurcated at 18 whereby it may straddle valve rod 19 slidably received in boss 20 at the bottom of the valve housing and slidably received in opening 21 in the cover plate 8. The shorter end of lever 15 is also slotted as at 22 for engagement with pin 23 extending through valve rod 19 whereby pivotal motion of lever 15 moves valve rod 19 endwise. A helical compression spring 24 is located around valve rod 19 between the cover plate 8 and the bifurcated end 18 of lever 15 whereby the spring 24 tends to move valve rod downwardly against valve seat 25.

The bottom side 26 of the interior portion of the housing 7 is inclined from a position under passage 11 downwardly toward boss 20, the boss having opening 27 therein in fluid communication, when the valve is open, with the passage 28 in the bottom of the housing 7 and with the passage 29 in the container cover 4. Thus when milk impinges against cup 14 causing it to move downwardly the valve rod 19 is moved upwardly lifting valve rod from the valve seat 25 thereby permitting the vacuum in container 1 to create a suction in housing 7, hose 12 and suction cup 13 to draw milk from the cow's udder. Whenever the flow of milk stops, as when the udder has been milked dry, cup 14 is then free to move upwardly and by reason of spring 24, valve rod 19 is moved downwardly to seat against valve seat 25 stopping suction from the container to the housing 7, hose 12 and suction cup 13.

The vacuum in housing 7 is not continuous but intermittent for the proper milking of the cow and thence the flow of milk from passage 11 against cup 14 will be intermittent, therefore means must be provided for preventing valve 25 from closing when milk is momentarily not impinging against cup 14. This means includes a shaft 30 rotatably mounted adjacent valve rod 19 in the sides of the housing 7. Secured to the shaft 30 and rotatable therewith are the spaced inertia wheels 31 and shaft 30 is formed into a pinion 32 between the inertia wheels 31 and meshes with the rack 33 formed along one side of valve rod 19. Thus the wheels 31 passing a large amount of inertia resist any rapid vertical motion of valve rod 19 and as the milk, when not flowing against cup 14 is only momentarily, valve rod can not move to closed position in the short length of time that the milk is not flowing.

When the milking machine is started, valve rod 19 is held in closed position against the valve seat 25 by spring 24 and manual means are provided for opening the valve whereby the intermittent vacuum in the container 1 may be transferred to the interior of the housing 7, to hose 12 and to udder suction cups 13. A push button 34 is provided with a shank 35 slidably received in the cover plate 8 with snap ring 36 located thereon to prevent detachment thereof from the cover plate. The inner end of shank 35 is located adjacent lever 15 whereby when the milking machine is started with a vacuum created in container 1, the valve closed and the cup 14 and longer end of lever 15 moved upwardly, button 34 may be depressed moving lever 15 downwardly opening valve 25 creating an intermittent vacuum in the housing 7, hose 12 and suction cups 13 whereby the respective udder is milked.

It will be noted that the valve mechanism is of such a construction that when bolts 9 are removed, the valve mechanism comprises only two separate assemblies detached from the cover 4. These assemblies comprise the valve housing with the inertia wheel construction and the cover assembly including valve rod, operating lever and start button which when thus separated are easily washed and sterilized which ease of cleaning is essential in milk handling mechanisms.

It will also be noted that with the bottom 26 of the interior of the housing 7 inclined toward outlet opening 27 any milk received in the housing will flow out into the container without any pockets of milk trapped within the housing.

In the operation of the milking machine each of the four suction cups 13 is positioned over one of the cow's udders and suction tubes 6 are each attached to a suction pump or other vacuum apparatus with control means for creating vacuum alternately in the tubes 6 and their respective milk receiving compartments. Each of the valve rods 19 are unseated by depression of the starting button 34 in each valve cover 8. This creates alternate intermittent vacuum in each pair of diametrically opposite valve housings on the cover 4. This starts a flow of milk from each udder against their respective impact cup 14 holding valve rod 24 from valve seat 25. The valves are held open as long as there is an intermittently continual flow of milk. The inertia wheels 31, preventing any rapid sliding motion of the valve rod 19 causes the valve to remain open even though a flow of milk is intermittent.

When the milk ceases to flow from any of the udders the respective valve for that udder will close by spring 24 as the milk ceases to impinge against the impact cup 14 thus preventing injury to the cow's udder and milk bag. Each one of the valves will thus be closed as the respective udder becomes dry independent of the operation of the other valves.

It is to be understood that the form of my invention herewith shown and described, is to be taken as a preferred example of the same, and that various changes in the shape, size and arrangement of parts may be resorted to without departing from the spirit of my invention, the scope of which is defined in the appended claims.

I claim:

1. A valve construction comprising a sealed chamber, an outlet opening leading from the chamber, a valve for closing and sealing the outlet opening, a fluid inlet leading into the chamber, a movable impact member adapted to be moved on impact of fluid thereagainst entering through the inlet, means for moving the valve to open position when the impact member is moved and yieldable means for moving the valve to closed position.

2. A valve construction as described in claim 1 with additional manual means for moving the valve to open position.

3. A valve construction as described in claim 1 with means for preventing rapid movement of the valve from open to closed position.

4. A milking machine comprising a container, means for causing intermittent vacuum within the container, a housing having a bottom and sides attached to the container, a cover plate attached to the housing providing a closed chamber, a boss integral with the bottom of the housing provided with a central opening having a valve seat, a passage into the chamber and a passage into the container, a valve rod slidably received in the boss and the cover plate adapted to move against the valve seat to close communication between the passage into the chamber and the passage into the container, an arm pivotally mounted between its ends on the cover plate within the chamber one end of which is pivotally connected to the valve rod and the other end of which is provided with an impact cup, a suction cup connected to the cover for liquid connection to within the chamber, the impact cup so located that liquid entering the chamber from the suction cup impinges against the impact cup thereby moving it and the valve to open position and spring means to move the valve to closed position.

5. A milking machine as defined in claim 4 in which the bottom of the chamber is inclined downwardly toward outlet passage.

6. A milking machine as defined in claim 4 in which the housing and cover plate are removably attached to the container and to each other with all parts to be cleaned and sterilized attached either to the housing or to the cover plate.

7. A milking machine comprising a container, means for causing intermittent vacuum within the container, a chamber in communication with the container, a valve having a stem adapted to close communication between the container and chamber, an arm pivotally connected within the chamber one end of which is pivotally connected to the stem of the valve, the other end of which is provided with an impact cup, a suction cup in communication with the chamber, the impact cup located so that liquid entering the chamber from the suction cup impinges against the impact cup moving the impact cup whereby the valve is moved to open position, spring means tending to move the valve to closed position, a rack formed along one side of the valve stem, a shaft freely rotatable in the chamber having a pinion formed thereon in mesh with the rack, an inertia wheel attached to said shaft whereby rapid motion of the valve is prevented.

ALBERT C. BLOEMERS.

REFERENCES CITED

The following references are of record in the file of this patent:

UNITED STATES PATENTS

| Number | Name | Date |
|---|---|---|
| 518,234 | Ferguson et al. | Apr. 17, 1894 |
| 529,576 | Withell | Nov. 20, 1894 |
| 1,109,800 | Sorenson | Sept. 8, 1914 |
| 1,387,983 | Hofmeister | Aug. 16, 1921 |
| 1,668,145 | Dean | May 1, 1928 |
| 2,172,865 | Danel | Sept. 12, 1939 |
| 2,211,784 | Kretzschmar | Aug. 20, 1940 |

FOREIGN PATENTS

| Number | Country | Date |
|---|---|---|
| 73,074 | Switzerland | 1916 |